United States Patent [15] 3,651,500

Weir [45] Mar. 21, 1972

[54] METHOD AND APPARATUS FOR DETECTING THE POSITION OF MOVING PARTS

[72] Inventor: Richard D. Weir, San Jose, Calif.

[73] Assignee: Iomec, Incorporated, Santa Clara, Calif.

[22] Filed: Apr. 6, 1970

[21] Appl. No.: 25,764

[52] U.S. Cl. ..................340/174.1 A, 340/174.1 C, 324/173

[51] Int. Cl. ..........................................................G11b 5/00

[58] Field of Search......................324/173, 34 PS, 34 D, 174; 340/174.1 A, 174.1 C

[56] References Cited

UNITED STATES PATENTS

| | | | |
|---|---|---|---|
| 3,065,461 | 10/1962 | Aronis | 340/174.1 A |
| 3,471,844 | 11/1969 | Schugt | 324/173 |
| 2,630,529 | 3/1953 | Mann et al. | 324/173 |
| 3,501,664 | 3/1970 | Veilette | 324/173 |
| 2,901,730 | 9/1959 | Goddard | 340/174.1 A |
| 2,866,179 | 12/1958 | Haanstra et al. | 340/174.1 A |

*Primary Examiner*—Robert L. Griffin
*Assistant Examiner*—Barry Leibowitz
*Attorney*—Townsend and Townsend

[57] ABSTRACT

An axially extending annular metal ring having a plurality of spaced slots is attached to a rotating disk. A driven magnetic inductor is placed on one side of the ring and a pick-up inductor is placed on the other side of the ring and opposite the driven inductor for the emission of output signals each time one of the slots comes into alignment with the two inductors. The output signals are transformed into digital pulses which coincide with the alignment of the center of the slot with the two inductors. The pulses, together with a reference or index signal that is generated during each revolution of the ring, are used to determine the relative position of the rotating member.

7 Claims, 2 Drawing Figures

PATENTED MAR 21 1972 3,651,500

INVENTOR.
RICHARD D. WEIR
BY
Townsend and Townsend
ATTORNEYS

METHOD AND APPARATUS FOR DETECTING THE POSITION OF MOVING PARTS

BACKGROUND OF THE INVENTION

This invention relates to method and apparatus for detecting the position of moving objects and it is particularly well adapted for use in determining the relative angular position of rotating members such as turntables.

Magnetic disk memories are presently widely used to increase the capacity of computers. Broadly speaking, the memories comprise a base or console having a turntable mounted thereon and a read/write head which is radially movable towards and away from the center of the turntable across the radial width of the magnetic disk for the recordation or retrieval of information, e.g., sets of data bits, on sectors of usually concentric, radially spaced data tracks of the disk. The sectors extend over a predetermined arc; usually there are four or eight sectors per circular track extending over 90° or 45°, respectively.

The recordation or retrieval of sets of data bits does not follow sequentially sector after sector, data track after data track, but takes place by randomly selecting any one of the sectors of any one of the tracks of the disks. This requires a rapid movement of the read/write head in a radial direction and its actuation to record or retrieve information when the selected data track sector passes the head. To enable the proper actuation of the head, the determination of the angular position of the sectors with respect to the read/write head is necessary.

In the prior art various attempts have been made to enable the accurate positioning. In one approach, an incandescent light source was mounted on one side of the disk and a photodiode was placed on the opposite side so that upon passage of a light aperture between the bulb and the diode the diode emitted a pulse. The pulse was then used to actuate the read/write head. Although this approach is relatively simple to construct, it is of low accuracy. Moreover, the light bulbs require frequent replacement which is tedious, time-consuming and expensive since it usually also involves the disassembly of a portion of the disk memory to provide access to the bulb. This requires a skilled technician and entails relatively long down times for the disk memory.

Another approach to determine the angular position of disk memory turntables to enable the timely actuation of the read/write head provides three inductor coils, a coil on one side of a rotating shield and two coils on the other side. The shield is provided with apertures and when one aperture passes between the coils a resonance frequency is set up and the coils break into oscillation. The first oscillating pulse is peaked and then used to determine the position of the turntable. To obtain satisfactory results, high precision and costly coils are necessary which make this approach economically undesirable.

These, and other similar prior art approaches to determine the angular position of rotating members are compromise solutions, are not fully satisfactory, and cause frequent problems in the operation of disk memories.

SUMMARY OF THE INVENTION

The present invention provides a method and apparatus for accurately and inexpensively determining the relative angular position of moving, and particularly, of rotating members. Broadly speaking, the method comprises the steps of generating a first signal, changing the signal amplitude in response to the presence of a predetermined point of the member at a predetermined position to form a second signal, and transforming the second signal into a digital pulse indicating the presence of the points at the predetermined position.

In the preferred form of the invention the method is practiced by rotating an annular metallic ring having a plurality of spaced-apart slots therein in synchronism with the member. The first signal is generated in the form of a magnetic field formed on one side of the ring and its amplitude is changed by detecting the signal at another, opposite side of the ring so that the magnitude of the detected signal increases when a slot moves past a reference line between the magnetic source and pick up coils. An output signal is then emitted in response to the detection of the magnetic field on the other side of the ring, the signal is transformed into a digital pulse indicating alignment of the center of the slot with the coils, and the pulse is then used to determine the angular position of the member. The present invention is particularly well adapted to the positioning of data track sectors on disk memories and the digital pulse is used to actuate the read/write head when a predetermined sector moves past the head.

The output signal from the pick up inductor is preferably transformed into sine waves, thereafter into square waves, and thereafter into an 0 to 5 volt digital pulse where the leading or trailing edge of the pulse represents the alignment of the center of the slot with the coils. That pulse can be fed into the diode transistor logic of a computer for the subsequent actuation of the read/write head.

To establish a reference point, an index pulse is also generated during each revolution of the annular ring, preferably by providing an index slot. The index pulse is used for pacing the computer or other means that receive the digital position pulses.

The apparatus to practice the method of the present invention comprises the above described slotted annular ring, means for driving the ring in synchronism with the rotating member, aligned inductor coils on each side of the ring and means for driving one of the coils to form a magnetic field for detection by the other one of the coils when a slot is aligned with two inductors. Electric circuitry is provided for transforming the inductor output signals into the above described digital pulses and means, responsive to the digital pulses, are provided for actuating the read/write head when the preselected data track sector passes the head.

The apparatus of the invention is relatively inexpensive to install and requires virtually no maintenance. Its accuracy is a substantial improvement, particularly over the aforementioned photodiode method of determining angular positions of rotating members. The method and apparatus of the present invention provide significant cost savings from the absence of any appreciable maintenance, the lack of repairs, and the absence of machine down times due to frequent maintenance work or the malfunctioning of one of the components of the positioning apparatus. Furthermore, the apparatus of the present invention employs low cost, widely available components which significantly reduce the initial cost of the device when compared to prior art positioning devices.

DESCRIPTION OF THE PREFERRED EMBODIMENTS

Figure 1:
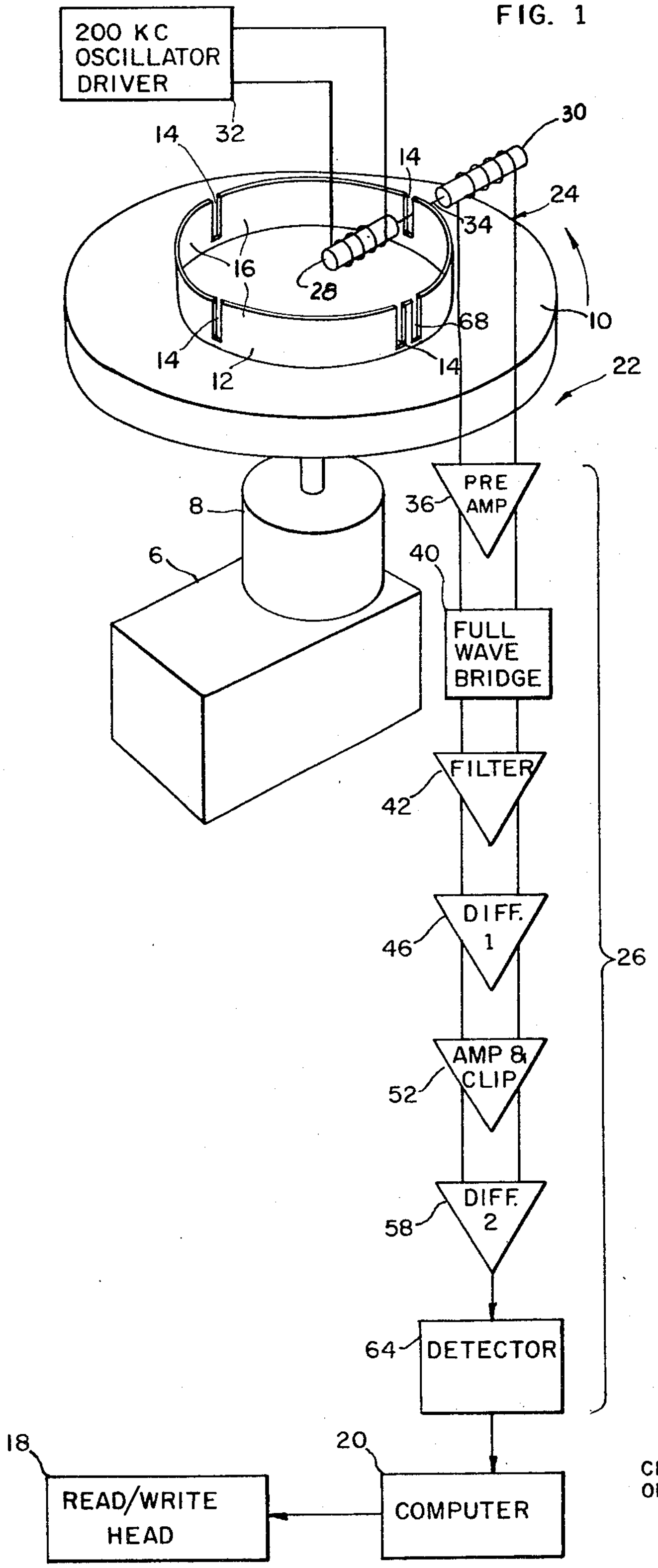
FIG. 1 is a schematic, perspective illustration of a rotating disk provided with an angular disk position detector constructed in accordance with the present invention.

Referring to FIG. 1, as schematically illustrated, console 6 of a disk memory includes a drive motor 8 which rotates turntable 10 mounting one or more disk packs (not shown) encapsulating conventional data storage disks. Mounted concentrically with the turntable for rotation therewith is a metallic shield or skirt 12 having a plurality of equally spaced slots 14 to define a plurality of skirt sectors 16. The spacing of the slots, and therewith the arc of each sector is selected to correspond to sectors of data tracks of the data storage disks on which a given set of data bits are stored. Generally, the data tracks are divided into four or eight sectors so that the skirt has four or eight slots 14 and skirt sectors 16.

During normal operation of the disk memory drive motor 8 rotates turntable 10, and therewith the disk tracks, at a given constant rate. Read/write head 18 of the disk memory is moved radially towards or away from the center of the disk for the sequential alignment with preselected ones of the concentric data tracks of the disk. After the head arrives at the desired data track it records or retrieves information whenever the data track sector containing the desired set of data bits, or on which data bits are to be recorded, passes the head. In normal operation the data track sectors are not sequentially recorded or read. Instead, sets of data bits are picked off or recorded on data track sectors which are randomly distributed throughout all data tracks on the disk. Computer 20 energizes the read/write head whenever the desired data track sector passes the head. To enable such actuation of the read/write head, it is necessary to provide the computer with input signals that locate the turntable, that is, that provide the computer with the necessary information to determine the relative position of turntable 10 with respect to read/write head 18 so that the head can be actuated whenever a particular sector of the turntable moves past the head. This information is provided to computer 20 by the positioning device 22 of the present invention which comprises the metallic shield 12 rotating in synchronism with the turntable, signal generating means 24, and electronic circuitry 26 for transforming output signals from the signal generating means into digital pulses that can be used in the diode transistor logic (DTL) of computer 20.

The signal generating means comprise a driven inductor 28 disposed on one side, e.g., the inside of skirt 12 and an aligned pickup inductor 30 disposed opposite from the driven inductor on the other side of the skirt. A 200 KC oscillator driver 32 is coupled to the driven inductor, excites the inductor and creates a magnetic field to generate a first signal. Skirt 12 shields pickup inductor 30 from the magnetic field, that is, the magnetic field at the pickup inductor is reduced so long as shield sector 16 is between the two inductors. When one of the slots 14 of the skirt passes between the inductors, the magnetic field at the pickup inductor increases to form a second tone modulated signal so that the output signal from the pickup inductor increases correspondingly until the center of the slot is aligned with an imaginary reference line 34 interconnecting the centers of the inductors. Thereafter, as the skirt continues to rotate, the magnetic field at the pickup inductor decreases again to its former level to result in a corresponding decrease of the output signal. The output signal remains stationary and of a relatively low magnitude until another one of the slots passes between the inductors.

Figure 2:
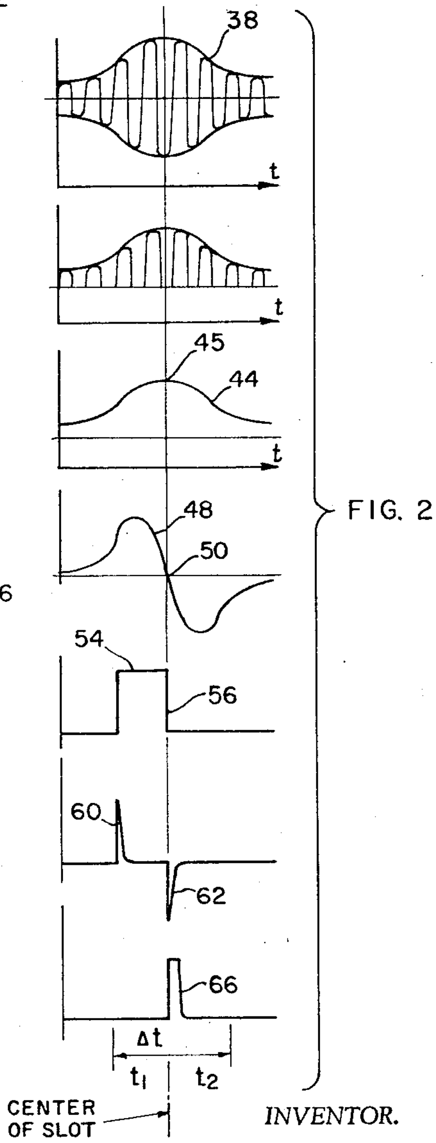
FIG. 2 graphically illustrates the formation of the digital pulses emitted by the detector to indicate the alignment of the center of a positioning slot rotating with disk and inductor coils of the position detector.

Referring now to FIGS. 1 and 2, the output signal from the pickup inductor 30 is fed into a preamplifier 36 which produces the output signal indicated at 38 adjacent the preamplifier shown in the FIG. 1. The amplified output signal is then put into a full wave bridge rectifier 40 and the rectified signal is fed into a filter 42 to eliminate the 200 KC carrier frequency and obtain a filtered signal or DC wave envelope 44 as illustrated in FIG. 2 opposite from filter 42.

It will be noted that a peak 45 of the wave envelope occurs when the center of skirt slot 14 is aligned with reference line 34. The leading edge of the slot passes the reference line at time $t_1$, the trailing edge passes it at $t_2$, the slot is disposed between the inductors for a time interval $\Delta t > t_2 - t_1$ and the alignment of the slot center with the reference line takes place at time $\Delta t/2\Delta$.

Wave envelope 44 is now differentiated in a first differentiator 46 resulting in a sine wave output or an AC signal 48 having a crossover point 50 that in time corresponds to the moment when the slot center is aligned with reference line 34. The first half of the AC output signal 48 is now amplified and clipped at 52, that is, the half sine wave is sufficiently amplified and cut off by the amplifier to yield a square wave 54. The negative going portion or trailing edge 56 of the wave chronologically corresponds to the alignment of the slot center and the reference line. The square wave is differentiated by a second differentiator 58 to yield two sharp pulse signals 60 and 62, the second pulse 62 corresponding to the center alignment of slot 14. The second pulse 62 is then fed into detector 64 to obtain a digital pulse 66 from 0 to 5 volts in which the trailing edge chronologically corresponds to the slot center alignment with reference line 34. The digital pulse is then fed into the computer 24 for actuating read/write head 18 whenever the desired data track sector passes the head.

In operation turntable 10 rotates continuously and skirt 12 includes an index slot 68 which is positioned closely adjacent one of the slots 14 for generating an index signal with pickup inductor 30 which is transformed into a DTL pulse for providing the computer with a reference during each revolution of the disk and thereby enabling the positioning of the disk with respect to inductors 28, 30.

The index pulse is fed to computer 20 for determining the beginning position of turntable 10 during each revolution. Thereafter the index pulse is removed and is not used for actuating read/write had 18.

The internal computer electronics for determining when read/write head 18 is to be actuated, that is, on which data track sector the head should record or retrieve information, are well known in the art and are therefore not described herein. While one embodiment of the invention has been shown and described, it will be obvious that other adaptations and modifications can be made without departing from the true spirit and scope of the invention.

I claim:

1. A method for determining the angular position of rotating disc comprising the steps of: attaching an axially oriented, annular metallic skirt having a plurality of cutouts to the disc for rotation therewith, generating a magnetic field on one side of the skirt, generating signals with the magnetic field on the other side of the skirt at a predetermined reference line whereby the presence of a cutout adjacent the predetermined point causes high magnitude signals and alignment of a cutout center with the reference line causes a signal peak, and transforming the high magnitude signals into detection pulses by generating sine wave signals from the high magnitude signals, the sine wave signals having a crossover point at the signal peak, clipping a half of said sine wave signal to form a square wave signal with an edge of the pulses coinciding with the peak so that the edge indicates the alignment of the center of the cutout with the predetermined line, whereby the detection pulses can be used for accurately determining the angular positioning of the disc and of the cutout center.

2. In method for reading and recording data bits on rotating disks by moving a read/write head in a radial direction across data tracks on the disks for selecting a predetermined track, and actuating the read/write head to read or write while a sector of the predetermined data track moves past the head, the improvement comprising: rotating an annular, metallic ring having a plurality of notches defining a plurality of sectors corresponding to the plurality of recording sectors on the disk data tracks, rotating the ring in synchronism with the disk, generating a magnetic field on one side of the ring at a predetermined position corresponding to the relative position of the read/write head on the data disk whereby portions of the ring intermediate notches reduce the intensity of the magnetic field on the other side of the ring, sensing the magnetic field at said point, emitting an output signal indicating the passage of a notch at the predetermined position, transforming the output signal into a digital pulse having a pulse edge indicating the presence of a fixed portion of a notch at the predetermined position by generating sine wave signals having a crossover point coincident with the predetermined position, clipping at least a half of said sine signal to form a square wave signal and forming the digital pulse from said square wave signal, and using the digital pulse to actuate the read/write head when the read/write head is positioned over a predetermined data track sector.

3. A method according to claim 2 wherein the step of forming the digital pulse comprises the steps of, differentiating the square wave signal to form a pulse signal, and forming a digital pulse from the pulse signal in which the pulse edge indicates the presence of the notch center at the predetermined position.

4. A method according to claim 3 wherein the step of forming the digital pulse comprises the step of forming a 0 to 5 volt pulse for use in a diode transistor logic.

5. A method of detecting the relative position of a rotatable member of a disk memory comprising the steps of rotating the member, generating a modulated magnetic field, receiving the magnetic field, interrupting the received magnetic field during predetermined portions of the rotating movement of the member to thereby generate a modulated signal having a maximum amplitude when the member is at a predetermined position during its rotating movement, rectifying the signal, filtering the rectified signal to provide a DC signal which is a direct analogue of the amplitude of the modulated signal so that the maximum intensity of the DC signal occurs when the member is at said predetermined position, converting the DC signal to an AC signal in which the crossover point is at the point of maximum amplitude of the filtered signal, clipping a first half of the AC signal to form a pulse in which the trailing edge coincides with the crossover point, and generating a trigger pulse with said trailing edge to provide a signal which chronologically coincides with the presence of the member at said predetermined position.

6. Apparatus for determining the relative angular position of a rotating member comprising: an annular magnetic shield rotating in synchronism with the member, the shield including a plurality of radially extending cutouts, means emitting electric output signals in response to the presence of a magnetic field fixedly mounted adjacent one side of the shield, means forming a magnetic field mounted opposite from the emitting means on the other side of the shield, whereby the presence of a cutout between the emitting means and the magnetic field forming means causes an increase in the magnitude of the output signals, and electric circuit means for generating pulses from the output signals of increased magnitude indicating a predetermined relative position of a cutout with respect to the emitting means, the electric circuit means including means for forming a sine wave signal from the output signals, and means for forming a pulse for use in a diode transistor logic from the sine wave signal having an edge coinciding with the alignment of the cutout center, the emitting means and the magnetic field forming means, whereby the relative angular position of the member can be determined with the pulse.

7. In magnetic disk memory having means for rotating a memory disk, a slotted magnetic skirt concentrically mounted to the rotating means, a driven inductor coil mounted on one side of the skirt and connected to a power source and a pickup coil mounted on the other side of the skirt opposite the inductor for generating a modulated signal having a peak amplitude when the slot center is aligned with the coils, the combination comprising: means rectifying the modulated signal, means filtering the rectified signal to provide a DC signal which is a direct analogue of the amplitude of the modulated signal so that the DC signal is peaked when the slot and the coils are aligned, means converting the DC signal to an AC signal having a crossover point at the point of peak amplitude of the filtered signal, means clipping the first half of the AC signal so that the trailing edge of the clipped signal occurs at the crossover point, and means generating a trigger pulse with the trailing edge to provide a signal which occurs in time at the instant the slot and the coils are aligned.

* * * * *